(12) United States Patent
Ogata et al.

(10) Patent No.: US 8,548,306 B2
(45) Date of Patent: Oct. 1, 2013

(54) AUDIO AND VIDEO RECORDING AND REPRODUCTION APPARATUS FOR REPRODUCING AUDIO SIGNALS HAVING DIFFERENT VOLUME LEVELS

(75) Inventors: Yasuhiro Ogata, Osaka (JP); Hiroji Takebayashi, Hyogo (JP); Atsushi Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 13/047,624

(22) Filed: Mar. 14, 2011

(65) Prior Publication Data

US 2011/0164763 A1 Jul. 7, 2011

Related U.S. Application Data

(62) Division of application No. 09/892,926, filed on Jun. 26, 2001, now abandoned.

(30) Foreign Application Priority Data

Jun. 26, 2000 (JP) ................. 2000-191935

(51) Int. Cl.
*H04N 5/928* (2006.01)
(52) U.S. Cl.
USPC ........... 386/338; 386/349; 386/350; 386/359; 386/337; 386/339; 386/285; 348/14.01; 348/705; 348/462; 348/738
(58) Field of Classification Search
USPC ................ 386/337–338, 349–350, 359, 285, 386/304; 348/705, 462, 738, 14.01
See application file for complete search history.

(56) References Cited

U.S. PATENT DOCUMENTS

| | | | |
|---|---|---|---|
| 4,132,935 A * | 1/1979 | Gaus et al. | 318/480 |
| 4,308,424 A | 12/1981 | Bice, Jr | |
| 4,901,147 A | 2/1990 | Tajima | |
| 5,400,305 A * | 3/1995 | Sadanaka | 369/2 |
| 5,426,534 A * | 6/1995 | Nakata et al. | 360/15 |
| 5,726,702 A | 3/1998 | Hamaguchi et al. | |
| 5,754,258 A | 5/1998 | Hanaya et al. | |
| 5,778,077 A | 7/1998 | Davidson | |
| 5,852,704 A * | 12/1998 | Kim | 386/212 |

(Continued)

FOREIGN PATENT DOCUMENTS

| | | |
|---|---|---|
| EP | 0697789 | 2/1996 |
| EP | 0727780 | 8/1996 |

(Continued)

OTHER PUBLICATIONS

The European Search Report from the corresponding European Application dated Jun. 4, 2003.

(Continued)

*Primary Examiner* — Helen Shibru
(74) *Attorney, Agent, or Firm* — Snell & Wilmer L.L.P.

(57) ABSTRACT

An audio and video recording and reproduction apparatus includes an audio signal switch section for outputting one of a first audio signal having a first volume level and a second audio signal having a second volume level by a switching operation; and a mute section for muting the first audio signal which is output from the audio signal switch section when the audio signal switch section switches the second audio signal to the first audio signal.

8 Claims, 3 Drawing Sheets

(56) References Cited

U.S. PATENT DOCUMENTS

| | | | |
|---|---|---|---|
| 5,915,066 | A | 6/1999 | Katayama |
| 6,026,168 | A | 2/2000 | Li et al. |
| 6,169,807 | B1 | 1/2001 | Sansur |
| 6,172,715 | B1 * | 1/2001 | Cho ............................. 348/565 |
| 6,445,877 | B1 | 9/2002 | Okada et al. |
| 6,552,753 | B1 | 4/2003 | Zhurbinskiy et al. |
| 6,839,442 | B2 | 1/2005 | Hori |
| 7,012,652 | B1 | 3/2006 | Weber |
| 7,865,929 | B1 * | 1/2011 | Inoue et al. .................. 725/151 |
| 2002/0186233 | A1 * | 12/2002 | Holtz et al. .................. 345/716 |
| 2003/0101452 | A1 | 5/2003 | Hanaya et al. |

FOREIGN PATENT DOCUMENTS

| | | |
|---|---|---|
| EP | 0848383 | 6/1998 |
| JP | 06-253222 | 9/1994 |
| JP | 08-111823 | 4/1996 |
| JP | 11-298807 | 10/1999 |
| KR | 1998-030596 | 7/1998 |
| TW | 306115 | 5/1997 |
| WO | WO 00/72589 | 11/2000 |

OTHER PUBLICATIONS

Office Action from corresponding Taiwan Application dated Nov. 6, 2002.
Office Action from corresponding Korean Application dated Jun. 30, 2003.
Office Action from corresponding Taiwan Application dated Apr. 11, 2005.
Non-Final Office Action dated Oct. 06, 2005 from corresponding U.S. Appl. No. 09/892,926.
Final Office Action dated Apr. 6, 2006 from corresponding U.S. Appl. No. 09/892,926.
Advisory Action dated Aug. 8, 2006 from corresponding U.S. Appl. No. 09/892,926.
Non-Final Office Action dated Oct. 6, 2006 from corresponding U.S. Appl. No. 09/892,926.
Final Office Action dated Mar. 23, 2007 from corresponding U.S. Appl. No. 09/892,926.
Advisory Action dated Jun. 22, 2007 from corresponding U.S. Appl. No. 09/892,926.
Non-Final Office Action dated Jul. 26, 2007 from corresponding U.S. Appl. No. 09/892,926.
Final Office Action dated Jan. 2, 2008 from corresponding U.S. Appl. No. 09/892,926.
Advisory Action dated Feb. 26, 2008 from corresponding U.S. Appl. No. 09/892,926.
Non-Final Office Action dated Jun. 9, 2008 from corresponding U.S. Appl. No. 09/892,926.
Final Office Action dated Nov. 24, 2008 from corresponding U.S. Appl. No. 09/892,926.
Non-Final Office Action dated May 11, 2009 from corresponding U.S. Appl. No. 09/892,926.
Restriction Requirement dated Nov. 27, 2009 from corresponding U.S. Appl. No. 09/892,926.
Final Office Action dated Mar. 16, 2010 from corresponding U.S. Appl. No. 09/892,926.
Non-Final Office Action dated Aug. 12, 2010 from corresponding U.S. Appl. No. 09/892,926.
Restriction Requirement dated Feb. 15, 2011 from corresponding U.S. Appl. No. 09/892,926.

* cited by examiner

US 8,548,306 B2

AUDIO AND VIDEO RECORDING AND REPRODUCTION APPARATUS FOR REPRODUCING AUDIO SIGNALS HAVING DIFFERENT VOLUME LEVELS

CROSS-REFERENCE TO RELATED APPLICATIONS

This application is a divisional application of and claims priority to U.S. patent application Ser. No. 09/892,926 entitled "AUDIO AND VIDEO RECORDING AND REPRODUCTION APPARATUS" which was filed on Jun. 26, 2001. Application Ser. No. 09/982,926 claims foreign priority to Japanese Application No. 2000-191935 filed on Jun. 26, 2000, all of which are incorporated herein by reference.

BACKGROUND OF THE INVENTION

1. Field of the Invention

The present invention relates to an audio and video recording and reproduction apparatus, and in particular to an audio and video recording and reproduction apparatus for reproducing a plurality of information recording media having audio signals having different volume levels stored thereon.

2. Description of the Related Art

Recently, audio and video recording and reproduction apparatuses for reproducing a plurality of types of information recording media, for example, DVD-Recording, DVD-Video disks, Video-CDs (hereinafter, referred to as "V-CDs") and CD-Audio (hereinafter, referred to as a "CD-A"), have been used.

These plurality of types of information recording media respectively have audio signals having different volume levels stored thereon.

When an operation mode of such an audio and video recording and reproduction apparatus is switched in order to reproduce a different type of information recording medium, an audio signal having a different volume level from the audio signal which was output before the switching can be suddenly output. This causes a user to feel uncomfortable.

SUMMARY OF THE INVENTION

An audio and video recording and reproduction apparatus according to the present invention includes an audio signal switch section for outputting one of a first audio signal having a first volume level and a second audio signal having a second volume level by a switching operation; and a mute section for muting the first audio signal which is output from the audio signal switch section when the audio signal switch section switches the second audio signal to the first audio signal.

In one embodiment of the invention, the mute section mutes the second audio signal which is output from the audio signal switch section when the audio signal switch section switches the first audio signal to the second audio signal.

In one embodiment of the invention, the first audio signal includes an external audio signal.

In one embodiment of the invention, the first audio signal includes an audio signal reproduced from an audio and video recording and reproduction medium.

In one embodiment of the invention, the second audio signal includes an audio signal reproduced from an audio and video reproduction-only medium.

In one embodiment of the invention, the second audio signal includes an audio signal reproduced from an audio reproduction-only medium.

In one embodiment of the invention, the first audio signal includes an external audio signal. The second audio signal is reproduced from a reproduction-only medium. The first volume level of the first audio signal and the second volume level of the second audio signal are different from each other. The audio and video recording and reproduction apparatus has a reproduction mode for reproducing the second audio signal from the reproduction-only medium and a stop mode for stopping the reproduction of the second audio signal from the reproduction-only medium. The audio signal switch section switches the second audio signal to the first audio signal when the reproduction mode is switched to the stop mode.

In one embodiment of the invention, the audio and video recording and reproduction apparatus further includes a video switch section for outputting a first video signal corresponding to the first audio signal or a second video signal corresponding to the second audio signal by a switching operation.

In one embodiment of the invention, the first video signal includes an external video signal.

In one embodiment of the invention, the first video signal includes a video signal reproduced from an audio and video recording and reproduction medium.

In one embodiment of the invention, the second video signal includes a video signal reproduced from an audio and video reproduction-only medium.

In one embodiment of the invention, the second video signal includes a still picture signal reproduced from a still picture signal medium.

In one embodiment of the invention, the second video signal includes a third video signal reproduced from the audio and video reproduction-only medium and a still picture signal reproduced from a still picture signal medium. The audio and video recording and reproduction apparatus has a reproduction mode for reproducing the third video signal from the audio and video reproduction-only medium and a stop mode for stopping the reproduction of the third video signal from the audio and video reproduction-only medium. The video signal switch section switches the third video signal to the still picture signal when the reproduction mode is switched to the stop mode.

In one embodiment of the invention, the second video signal includes a still picture signal reproduced from a still picture medium. The video switch section outputs the still picture signal when the mute section mutes the first audio signal.

Thus, the invention described herein makes possible the advantages of providing an audio and video recording and reproduction apparatus usable to reproduce audio signals having different volume levels, which prevents an audio signal having a different volume level from the previously reproduced audio signal from being output, and thus prevents the user from feeling uncomfortable.

These and other advantages of the present invention will become apparent to those skilled in the art upon reading and understanding the following detailed description with reference to the accompanying figures.

DETAILED DESCRIPTION

Hereinafter, the present invention will be described by way of illustrative examples with reference to the accompanying drawings.

Figure 1:
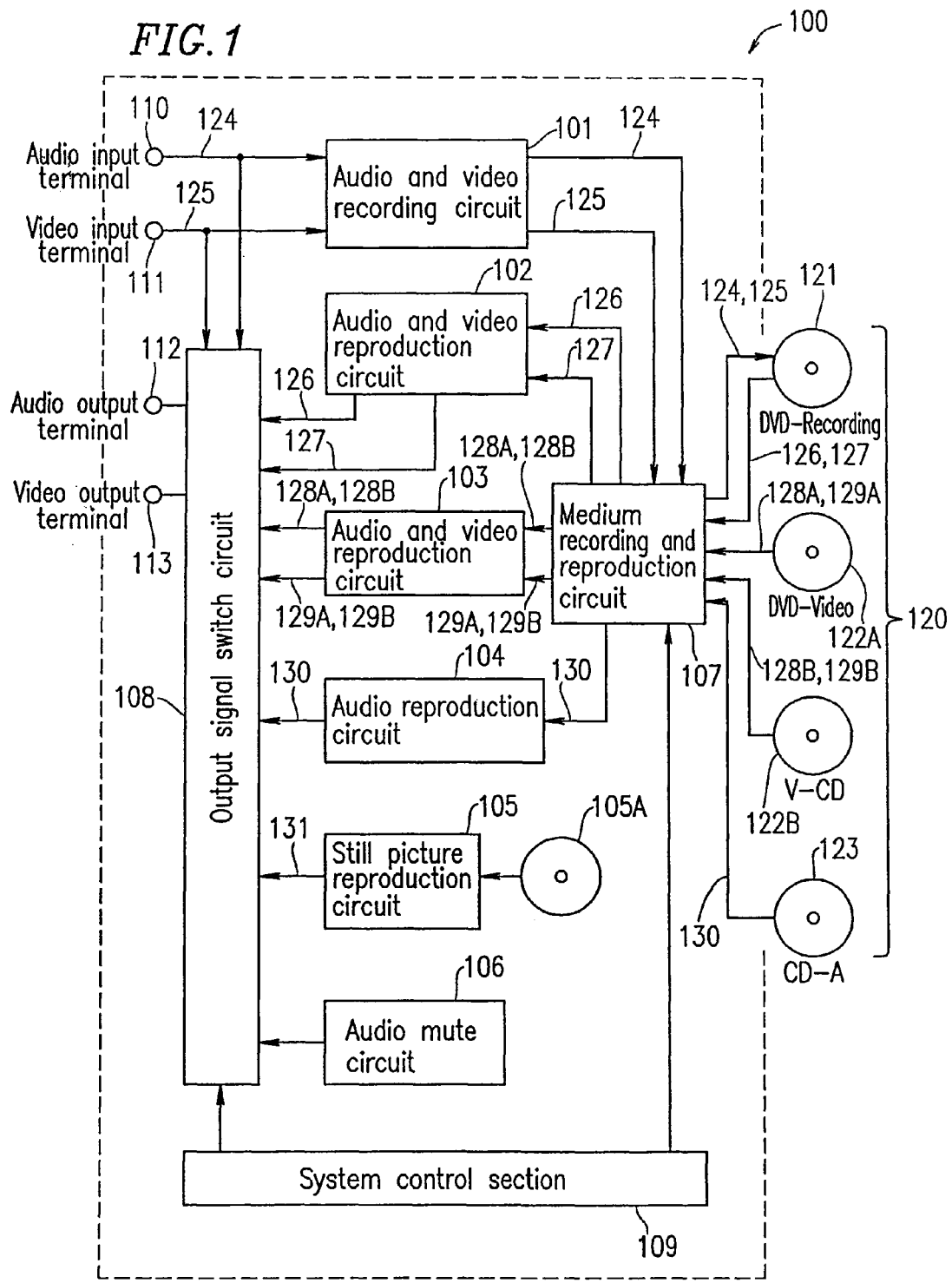
FIG. 1 is a block diagram illustrating a structure of an audio and video recording and reproduction apparatus according to one example of the present invention.

FIG. 1 is a block diagram of an audio and video recording and reproduction apparatus 100 according to one example of the present invention.

Referring to FIG. 1, the audio and video recording and reproduction apparatus 100 includes an audio and video recording circuit 101, audio and video reproduction circuits 102 and 103, an audio reproduction circuit 104, a still picture reproduction circuit 105, an audio mute circuit 106, a medium recording and reproduction circuit 107, an output signal switch circuit 108, a system control section 109, an audio input terminal 110, a video input terminal 111, an audio output terminal 112 and a video output terminal 113.

The audio and video recording and reproduction apparatus 100 performs recording or reproduction of a video signal and/or an audio signal to and from the information medium 120. The information medium 120 can be one of an audio and video recording and reproduction medium 121, a first audio and video reproduction-only medium 122A, a second audio and video reproduction-only medium 122B, and an audio reproduction-only medium 123. The audio and video recording and reproduction medium 121 can be a DVD-Recording medium. The first audio and video reproduction-only medium 122A can be a DVD-Video medium. The second audio and video reproduction-only medium 122B can be a V-CD medium. The audio reproduction-only medium 123 can be a CD-A medium.

The audio and video recording and reproduction apparatus 100 records a video signal and an audio signal to the audio and video recording and reproduction medium 121, and reproduces a video signal and an audio signal from the audio and video recording and reproduction medium 121. The audio and video recording and reproduction apparatus 100 reproduces a video signal and an audio signal from the first audio and video reproduction-only medium 122A and the second audio and video reproduction-only medium 122B. The audio and video recording and reproduction apparatus 100 reproduces an audio signal from the audio reproduction-only medium 123.

The audio and video recording circuit 101 receives an external audio signal 124 which is input to the audio input terminal 110 and performs processing of the external audio signal 124 necessary to record the external audio signal 124 to the audio and video recording and reproduction medium 121.

The medium recording and reproduction circuit 107 records the external audio signal 124 processed by the audio and video recording circuit 101 to the audio and video recording and reproduction medium 121. The audio and video recording circuit 101 also receives an external video signal 125 which is input to the video input terminal 111 and performs processing of the external video signal 125 necessary to record the external video signal 125 to the audio and video recording and reproduction medium 121. The medium recording and reproduction circuit 107 records the external video signal 125 processed by the audio and video recording circuit 101 to the audio and video recording and reproduction medium 121.

The medium recording and reproduction circuit 107 reproduces an audio signal 126 and a video signal 127 recorded on the audio and video recording and reproduction medium 121. The audio and video reproduction circuit 102 performs processing of the audio signal 126 and the video signal 127 necessary to output the audio signal 126 and the video signal 127 respectively from the audio output terminal 112 and the video output terminal 113.

The medium recording and reproduction circuit 107 reproduces an audio signal 128A and a video signal 129A recorded on the first audio and video reproduction-only medium 122A. The audio and video reproduction circuit 103 performs processing of the audio signal 128A and the video signal 129A necessary to output the audio signal 128A and the video signal 129A respectively from the audio output terminal 112 and the video output terminal 113.

The medium recording and reproduction circuit 107 reproduces an audio signal 128B and a video signal 129B recorded on the second audio and video reproduction-only medium 122B. The audio and video reproduction circuit 103 performs processing of the audio signal 128B and the video signal 129B necessary to output the audio signal 128B and the video signal 129B respectively from the audio output terminal 112 and the video output terminal 113.

The medium recording and reproduction circuit 107 reproduces an audio signal 130 recorded on the audio reproduction-only medium 123. The audio reproduction circuit 104 performs processing of the audio signal 130 necessary to output the audio signal 130 from the audio output terminal 112. The still picture reproduction circuit 105 outputs a still picture signal 131 reproduced from a still picture medium 105A.

The audio signal 126 reproduced by the audio and video recording and reproduction medium 121 and the external audio signal 124 input to the audio input terminal 110 have an average volume level A1 (first volume level). The audio signal 128A reproduced from the first audio and video reproduction-only medium 122A has an average volume level B1 (second volume level). The audio signal 128B reproduced from the second audio and video reproduction-only medium 122B has an average volume level C1 (second volume level). The audio signal 130 reproduced from the audio reproduction-only medium 123 has an average volume level D1 (second volume level). In the following description, the average volume level will also be referred to as a "volume level" for the sake of simplicity.

The output signal switch circuit 108 switches the audio signals 126, 124, 128A, 128B and 130 to output one of these signal from the audio output terminal 112.

When the output signal switch circuit 108 switches the audio signal 128A having the volume level B1 to the audio signal 126 having the volume level A1, the audio mute circuit 106 mutes the audio signal 126 output from the audio output terminal 112. When the output signal switch circuit 108 switches the audio signal 128A having the volume level B1 to the external audio signal 124 having the volume level A1, the audio mute circuit 106 mutes the external audio signal 124 output from the audio output terminal 112.

When the output signal switch circuit 108 switches the audio signal 128B having the volume level C1 to the audio signal 126 having the volume level A1, the audio mute circuit 106 mutes the audio signal 126 output from the audio output terminal 112. When the output signal switch circuit 108 switches the audio signal 128B having the volume level C1 to the external audio signal 124 having the volume level A1, the audio mute circuit 106 mutes the external audio signal 124 output from the audio output terminal 112.

When the output signal switch circuit 108 switches the audio signal 130 having the volume level D1 to the audio signal 126 having the volume level A1, the audio mute circuit 106 mutes the audio signal 126 output from the audio output terminal 112. When the output signal switch circuit 108 switches the audio signal 130 having the volume level D1 to the external audio signal 124 having the volume level A1, the audio mute circuit 106 mutes the external audio signal 124 output from the audio output terminal 112. The system control section 109 controls operations of the entire audio and video recording and reproduction apparatus 100 including the output signal switch circuit 108 and the medium recording reproduction circuit 107.

As described above, when the output signal switch circuit 108 switches the audio signal 128A (B1), the audio signal 128B (C1) or the audio signal 130 (D1) to the audio signal 126 (A1) or the external audio signal 124 (A1), the audio mute circuit 106 mutes the audio signal 126 or the external audio signal 124 output from the audio output terminal 112.

Conversely, when the output signal switch circuit 108 switches the audio signal 126 (A1) or the external audio signal 124 (A1) to the audio signal 128A (B1), the audio signal 128B (C1) or the audio signal 130 (D1), the audio mute circuit 106 mutes the audio signal 128A (B1), 128B (C1) or 130 (D1) output from the audio output terminal 112.

Figures 2, 3:
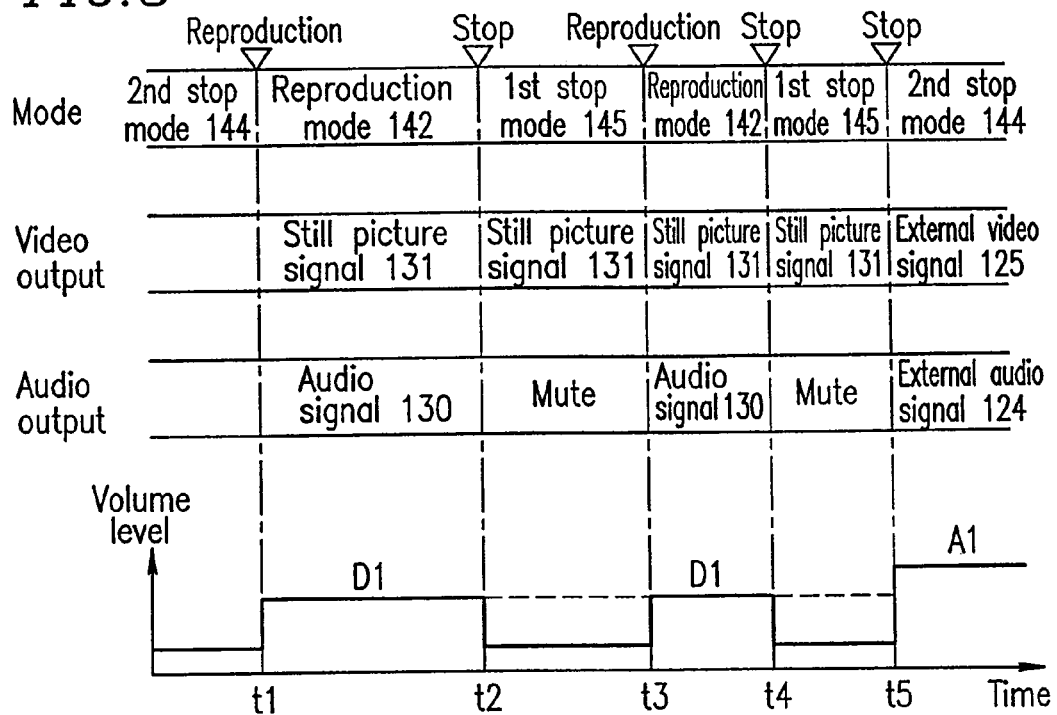
FIG. 2 shows the relationship between an average volume level output from the audio and video recording and reproduction apparatus shown in FIG. 1, an input medium and an operation mode thereof.
FIG. 3 is a timing diagram illustrating an operation performed by the audio and video recording and reproduction apparatus shown in FIG. 1 when a reproduction mode is switched to a stop mode while a CD-A medium is mounted on the audio and video recording and reproduction apparatus.

FIG. 2 shows the relationship between an average volume level output from the audio and video recording and reproduction apparatus 100 (FIG. 1), an input medium and an operation mode thereof.

As shown in FIG. 2 and also described above, the input media used for the audio and video recording and reproduction apparatus 100 include the audio and video recording and reproduction medium 121 (e.g., DVD-Recording medium), the first audio and video reproduction-only medium 122A (e.g., DVD-Video medium), the second audio and video reproduction-only medium 122B (e.g., V-CD medium), and the audio reproduction-only medium 123 (e.g., CD-A medium). Operation modes of the audio and video recording and reproduction apparatus 100 include a stop mode 141, a reproduction mode 142 and a recording mode 143. The stop mode 141 includes a first stop mode 145 and a second stop mode 144.

As shown in FIG. 2, when the input medium is the audio and video recording and reproduction medium 121, the audio and video recording and reproduction apparatus 100 outputs an audio signal having a volume level A1 in any of the stop mode 141, the reproduction mode 142 and the recording mode 143 as described below. In the stop mode 141 and the recording mode 143, the audio and video recording and reproduction apparatus 100 outputs the external video signal 124 (A1) which is input to the audio input terminal 110. The external video signal 124 can be, for example, an audio signal from a TV. In the reproduction mode 142, the audio and video recording and reproduction apparatus 100 outputs the audio signal 126 (A1) reproduced from the audio and video recording and reproduction medium 121.

When the input medium is the first audio and video reproduction-only medium 122A and the operation mode is the reproduction mode 142, the audio and video recording and reproduction apparatus 100 outputs the audio signal 128A (B1) reproduced from the first audio and video reproduction-only medium 122A. When the input medium is the second audio and video reproduction-only medium 122B and the operation mode is the reproduction mode 142, the audio and video recording and reproduction apparatus 100 outputs the audio signal 128B (C1) reproduced from the first audio and video reproduction-only medium 122B. When the input medium is the audio reproduction-only medium 123 and the operation mode is the reproduction mode 142, the audio and video recording and reproduction apparatus 100 outputs the audio signal 130 (D1) reproduced from the audio reproduction-only medium 123.

When the input medium is the first audio and video reproduction-only medium 122A, the second audio and video reproduction-only medium 122B or the audio reproduction-only medium 123, and the operation mode is the first stop mode 145, the audio mute circuit 106 (FIG. 1) mutes the external audio signal 124 (A1) output from the audio output terminal 112 (FIG. 1). In the second stop mode 144, the audio and video recording and reproduction apparatus 100 outputs the external audio signal 124 (A1).

FIG. 3 is a timing diagram illustrating an operation performed by the audio and video recording and reproduction apparatus 100 when the reproduction mode 142 is switched to the stop mode 141 while the input medium is the audio reproduction-only medium 123 (e.g., CD-A).

At time t1, the audio and video recording and reproduction apparatus 100 starts reproduction of the audio reproduction-only medium 123. The output switch circuit 108 outputs the audio signal 130 (D1) reproduced from the audio reproduction-only medium 123. The output switch circuit 108 outputs the still picture signal 131, which is output from the still picture reproduction circuit 105, through the video output terminal 113.

At time t2, the reproduction mode 142 is switched to the first stop mode 145. The output switch circuit 108 switches the audio signal to be output through the audio output terminal 112 from the audio signal 130 (D1) to the external audio signal 124 (A1). The audio mute circuit 106 mutes the external audio signal 124. The output switch circuit 108 continuously outputs the still picture signal 131 from the video output terminal 113.

At time t3, the first stop mode 145 is switched to the reproduction mode 142. The audio and video recording and reproduction apparatus 100 resumes reproduction of the audio reproduction-only medium 123. The output switch circuit 108 outputs the audio signal 130 (D1) from the audio output terminal 112. The output switch circuit 108 continuously outputs the still picture signal 131 from the video output terminal 113.

At time t4, the reproduction mode 142 is again switched to the first stop mode 145. The output switch circuit 108 switches the audio signal to be output through the audio output terminal 112 from the audio signal 130 (D1) to the external audio signal 124 (A1). The audio mute circuit 106 mutes the external audio signal 124. The output switch circuit 108 continuously outputs the still picture signal 131 from the video output terminal 113.

At time t5, the audio mute circuit 106 releases the mute setting of the external audio signal 124 (A1). The output switch circuit 108 outputs the external audio signal 124 (A1)

released from the muted state. The output switch circuit 108 outputs the external video signal 125 which is input to the video input terminal 111 (FIG. 1).

As described above, when the audio signal to be output through the audio output terminal 112 is switched from the audio signal 130 (D1) reproduced from the audio reproduction-only medium 123 (CD-A) to the external audio signal 124 (A1) (time t2 and t4), the external audio signal 124 (A1) is muted.

Therefore, even when the average volume level D1 of the audio signal 130 output in the reproduction mode 142 and the average volume level A1 of the external audio signal 124 output in the stop mode 141 are significantly different from each other, a significantly different volume of audio signal is prevented from being output when the reproduction mode 142 is switched to the stop mode 141. Thus, the user does not feel disturbed.

Figure 4:
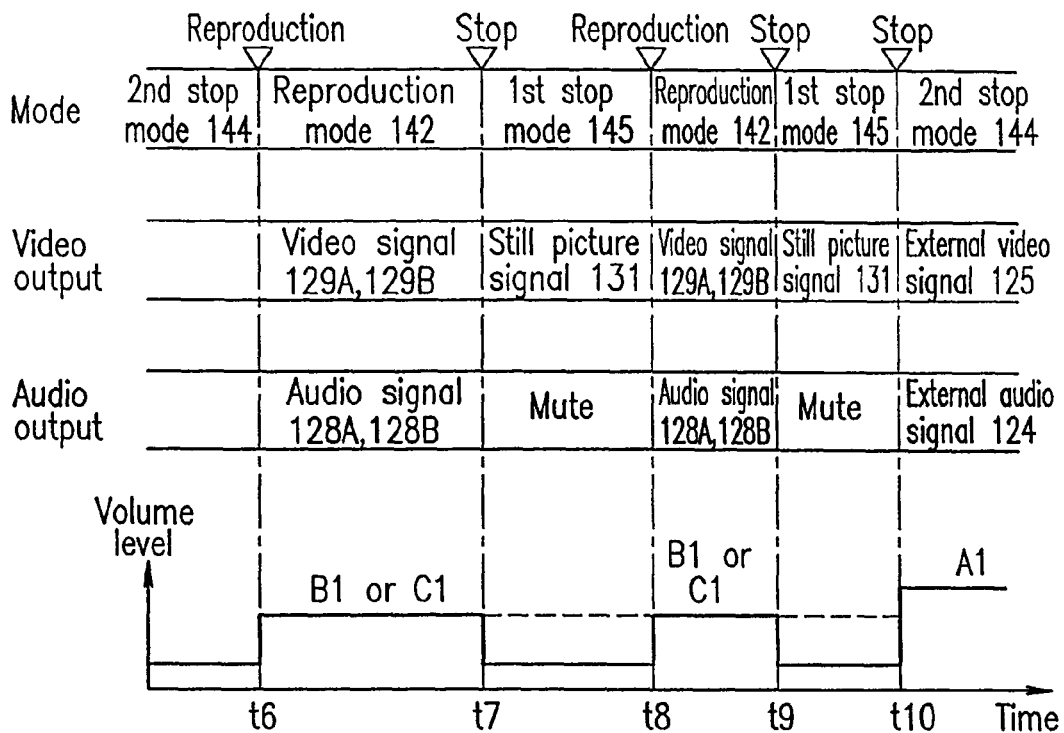
FIG. 4 is a timing diagram illustrating an operation performed by the audio and video recording and reproduction apparatus shown in FIG. 1 when a reproduction mode is switched to a stop mode while a DVD-Video medium or a V-CD medium is mounted on the audio and video recording and reproduction apparatus.

FIG. 4 is a timing diagram illustrating an operation performed by the audio and video recording and reproduction apparatus 100 when the reproduction mode 142 is switched to the stop mode 141 while the input medium is the first audio and video reproduction-only medium 122A (e.g., DVD-Video) or the second audio and video reproduction-only medium 122B (e.g., V-CD).

At time t6, the audio and video recording and reproduction apparatus 100 starts reproduction of the first audio and video reproduction-only medium 122A or the second audio and video reproduction-only medium 122B. The output switch circuit 108 outputs the video signal 129A reproduced from the first audio and video reproduction-only medium 122A or the video signal 129B reproduced from second audio and video reproduction-only medium 122B through the video output terminal 113 (FIG. 1). The output switch circuit 108 outputs the audio signal 128A (B1) reproduced from the first audio and video reproduction-only medium 122A or the audio signal 128B (C1) reproduced from second audio and video reproduction-only medium 122B through the video output terminal 113.

At time t7, the reproduction mode 142 is switched to the first stop mode 145. The output switch circuit 108 switches the video signal to be output through the video output terminal 113 from the video signal 129A or 129B to the still picture signal 131 output from the still picture reproduction circuit 105. The output switch circuit 108 switches the audio signal to be output through the audio output terminal 112 from the audio signal 128A (B1) or 128B (C1) to the external audio signal 124 (A1). The audio mute circuit 106 mutes the external audio signal 124.

At time t8, the first stop mode 145 is switched to the reproduction mode 142. The audio and video recording and reproduction apparatus 100 resumes reproduction of the first audio and video reproduction-only medium 122A or the second audio and video reproduction-only medium 122B. The output switch circuit 108 outputs the audio signal 128A (B1) reproduced from the first audio and video reproduction-only medium 122A or the audio signal 128B (C1) reproduced from the second audio and video reproduction-only medium 122B. The output switch circuit 108 switches the video signal to be output through the video output terminal 113 from the still picture signal 131 to the video signal 129A reproduced from the first audio and video reproduction-only medium 122A or the video signal 129B reproduced from the second audio and video reproduction-only medium 122B.

At time 9, the reproduction mode 142 is again switched to the first stop mode 145. The output switch circuit 108 switches the audio signal to be output through the audio output terminal 112 from the audio signal 128A (B1) or the audio signal 128B (C1) to the external audio signal 124 (A1). The audio mute circuit 106 mutes the external audio signal 124. The output switch circuit 108 switches the video signal to be output through the video output terminal 113 from the video signal 129A or 129B to the still picture signal 131 from the video output terminal 113.

At time t10, the audio mute circuit 106 releases mute of the external audio signal 124 (A1). The output switch circuit 108 outputs the external audio signal 124 (A1) released from the muted state. The output switch circuit 108 outputs the external video signal 125 which is input to the video input terminal 111 (FIG. 1).

As described above, when the audio signal to be output through the audio output terminal 112 is switched from the audio signal 128A (B1) reproduced from the first audio and video reproduction-only medium 122A (DVD-Video) or the audio signal 128B (C1) reproduced from the second audio and video reproduction-only medium 122B (V-CD) to the external audio signal 124 (A1) (time t7 and t9), the external audio signal 124 (A1) is muted.

Therefore, even when the average volume level B1 of the audio signal 128A or the average volume level C1 of the audio signal 128B output in the reproduction mode 142 and the average volume level A1 of the external audio signal 124 output in the stop mode 141 are significantly different from each other, a significantly different volume of audio signal is prevented from being output when the reproduction mode 142 is switched to the stop mode 141. Thus, the user does not feel disturbed.

Figure 5:
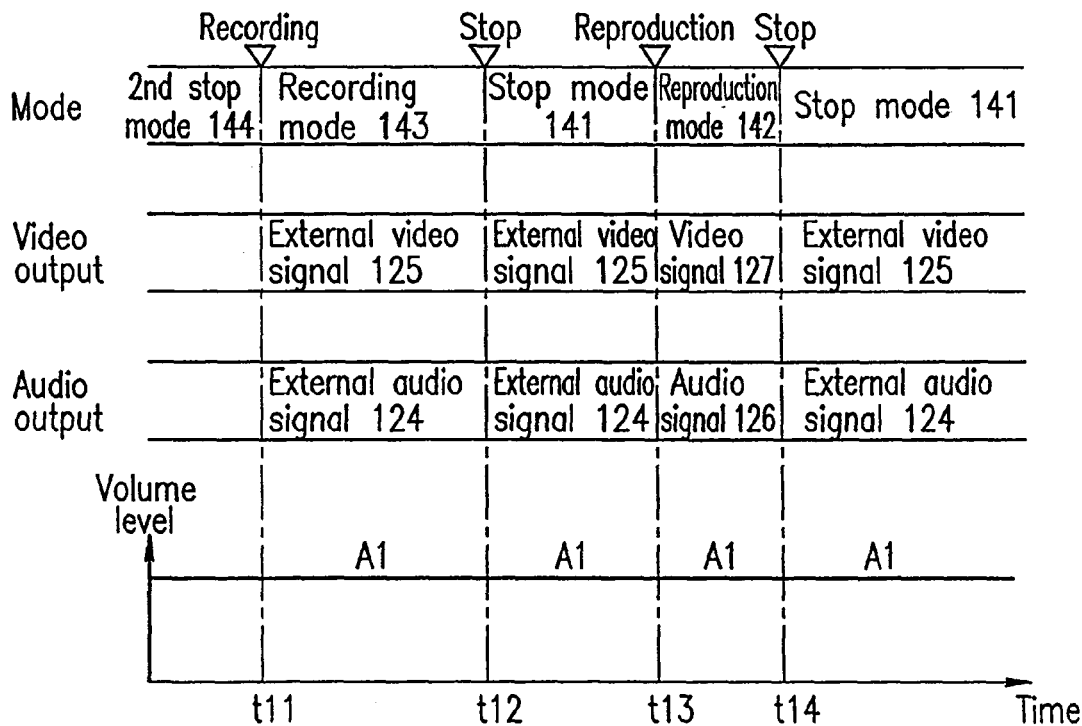
FIG. 5 is a timing diagram illustrating an operation performed by the audio and video recording and reproduction apparatus shown in FIG. 1 when a switching operation between a recording mode, a stop mode and a reproduction mode is performed while DVD-Recording medium is mounted on the audio and video recording and reproduction apparatus.

FIG. 5 is a timing diagram illustrating an operation performed by the audio and video recording and reproduction apparatus 100 when a switching operation between the recording mode 143, the stop mode 141 and the reproduction mode 142 is performed while the input medium is the audio and video recording and reproduction medium 121 (DVD-Recording).

At time t11, the audio and video recording and reproduction apparatus 100 starts recording to the audio and video recording and reproduction medium 121. The output switch circuit 108 outputs the external video signal 125, which is input through the video input terminal 111, through the video output terminal 113. The output switch circuit 108 outputs the external audio signal 124 (A1), which is input through the audio input terminal 110, through the audio output terminal 112.

At time t12, the recording mode 143 is switched to the stop mode 141. The audio and video recording and reproduction apparatus 100 stops recording to the audio and video recording and reproduction medium 121. The output switch circuit 108 continuously outputs the external video signal 125 through the video output terminal 113. The output switch circuit 108 continuously outputs the external audio signal 124 (A1) through the audio output terminal 112.

At time t13, the first stop mode 141 is switched to the reproduction mode 142. The audio and video recording and reproduction apparatus 100 starts reproduction of the audio and video recording and reproduction medium 121. The output switch circuit 108 outputs the video signal 127 reproduced from the audio and video recording and reproduction medium 121 through the video output terminal 113. The output switch circuit 108 outputs the audio signal 126 (A1) reproduced from the audio and video recording and reproduction medium 121 through the audio output terminal 112.

At time t14, the reproduction mode 142 is switched to the stop mode 141. The output switch circuit 108 switches the video signal to be output through the video output terminal 113 from the video signal 127 to the external video signal 125 which is input from the video input terminal 111. The output switch circuit 108 outputs the external video signal 125 through the video output terminal 113. The output switch circuit 108 switches the audio signal to be output through the audio output terminal 112 from the audio signal 126 (A1) to the external audio signal 124 which is input from the video input terminal 112. The output switch circuit 108 outputs the external audio signal 124 through the audio output terminal 112.

As described above, when the input medium is the audio and video recording and reproduction medium 121 (DVD-Recording), the average volume level output from the audio output terminal 112 is the same (A1) in the recording mode 143, the reproduction mode 142 and the stop mode 141. Accordingly, no mute operation is performed after a switching operation between the recording mode 143, the reproduction mode 142 and the stop mode 141 is performed.

In the case where an external audio signal (for example, au audio signal from a TV tuner) and audio signal stored on various media having different volume levels (for example, the first audio and video reproduction-only medium 122A (e.g., DVD-Video), the second audio and video reproduction-only medium 122B (e.g., V-CD), and the audio reproduction-only medium 123 (e.g., CD-A)) are reproduced by the same apparatus, the following problem may occur. When the external audio signal is output immediately after the reproduction of the medium is stopped, the volume is suddenly increased or decreased due to the difference in volume levels of the different audio signals. In order to solve the disturbance felt by the user when this occurs, the audio and video recording and reproduction apparatus 100 in this example mutes the audio signal output therefrom and outputs a still picture signal as the video signal. Thus, the above-mentioned disturbance felt by the user is solved even when one type of audio signal is switched to another type of audio signal having a different volume level from the one output before.

In the above example, while the audio and video recording and reproduction medium 121 is mounted on the audio and video recording and reproduction apparatus 100, the external audio signal 124 and the external video signal 125 are output without being processed in any way in the recording mode 143 and the stop mode 141. In this way, input signals (the external audio signal 124 and the external video signal 125) are monitored without being processed in any way in the recording mode 143 and the stop mode 141, although not in the reproduction mode 142.

As described above, the present invention provides an audio and video recording and reproduction apparatus usable to reproduce audio signals having different volume levels, which prevents an audio signal having a different volume level from the previously reproduced audio signal from being output, and thus prevents the user from feeling uncomfortable.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

The invention claimed is:

1. An audio processing apparatus, comprising:
 a first obtaining section configured to obtain a first audio signal from a mounted recording medium;
 a second obtaining section configured to obtain a second audio signal from an external audio input terminal;
 an output control section configured to selectively switch between the first audio signal obtained by the first obtaining section and the second audio signal obtained by the second obtaining section to be output as a sound from a speaker; and
 a mode setting section configured to set an operation mode to a reproduction mode for reproducing the first audio signal from the mounted recording medium or a stop mode for stopping reproduction of the first audio signal from the mounted recording medium;
 wherein when the mode setting section sets the operation mode from the reproduction mode to the stop mode, the output control section switches the sound to be output from the speaker from a sound based on the first audio signal to a sound based on the second audio signal, and mutes the second audio signal.

2. The audio processing apparatus according to claim 1, wherein the stop mode includes a first stop mode and a second stop mode,
 when the mode setting section sets the operation mode from the reproduction mode to the first stop mode, the output control section switches the sound to be output from the speaker from the sound based on the first audio signal to the sound based on the second audio signal and mutes the second audio signal, and
 when the mode setting section sets the operation mode from the first stop mode to the second stop mode, the output control section releases the second audio signal from the muted state.

3. The audio processing apparatus according to claim 1, wherein the second audio signal having a volume level different from that of the first audio signal.

4. The audio processing apparatus according to claim 3, wherein the second audio signal having a larger volume level than that of the first audio signal.

5. An audio processing method comprising:
 obtaining a first audio signal from a recording medium mounted to an apparatus;
 obtaining a second audio signal from an external audio input terminal of the apparatus;
 switching between the first audio signal and the second audio signal to be output as a sound from a speaker;
 setting an operation mode to a reproduction mode for reproducing the first audio signal from the mounted recording medium or a stop mode for stopping reproduction of the first audio signal from the mounted recording medium;
 wherein when the operation mode is set from the reproduction mode to the stop mode, the sound to be output from the speaker is switched from a sound based on the first audio signal to a sound based on the second audio signal, and the second audio signal is muted.

6. The audio processing method according to claim 5, wherein the stop mode includes a first stop mode and a second stop mode,
 when the operation mode is set from the reproduction mode to the first stop mode, the sound to be output from the speaker is switched from the sound based on the first audio signal to the sound based on the second audio signal and the second audio signal is muted, and
 when the operation mode is set from the first stop mode to the second stop mode, the second audio signal is released from the muted state.

7. The audio processing method according to claim 5, wherein the second audio signal having a volume level different from that of the first audio signal.

8. The audio processing method according to claim 7, wherein the second audio signal having a larger volume level than that of the first audio signal.

* * * * *